Oct. 31, 1967  C. W. OTTO  3,350,586
DYNAMOELECTRIC MACHINE ELECTRICAL COMPONENT MOUNTING
AND LEAD SECURING ARRANGEMENT
Filed Feb. 19, 1965
2 Sheets-Sheet 2
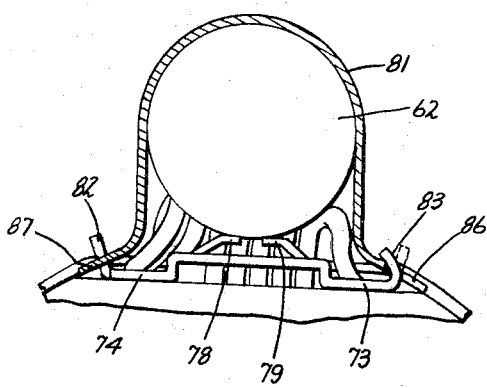
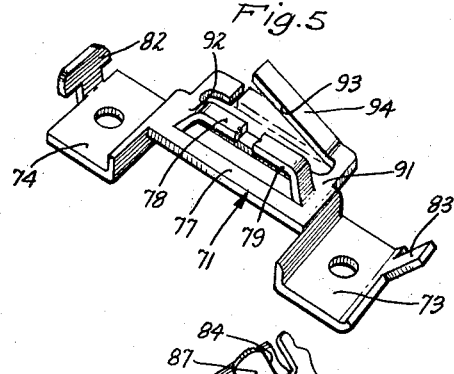
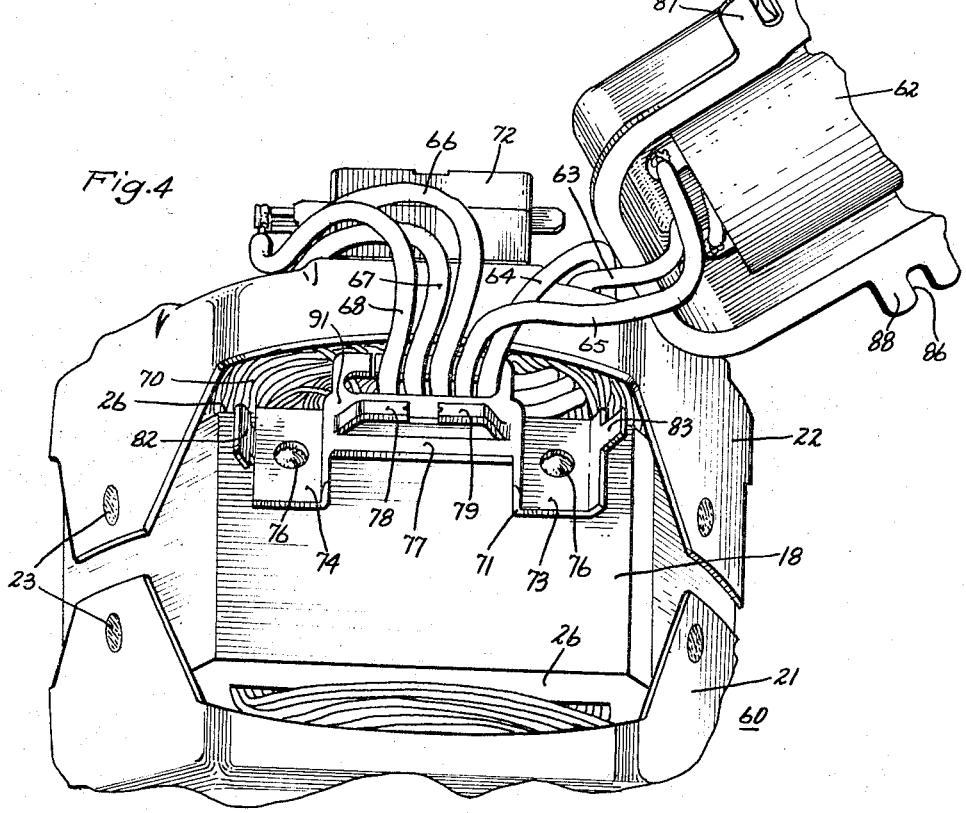
INVENTOR.
Charles W. Otto,
BY
John M. Stoudt
Attorney.

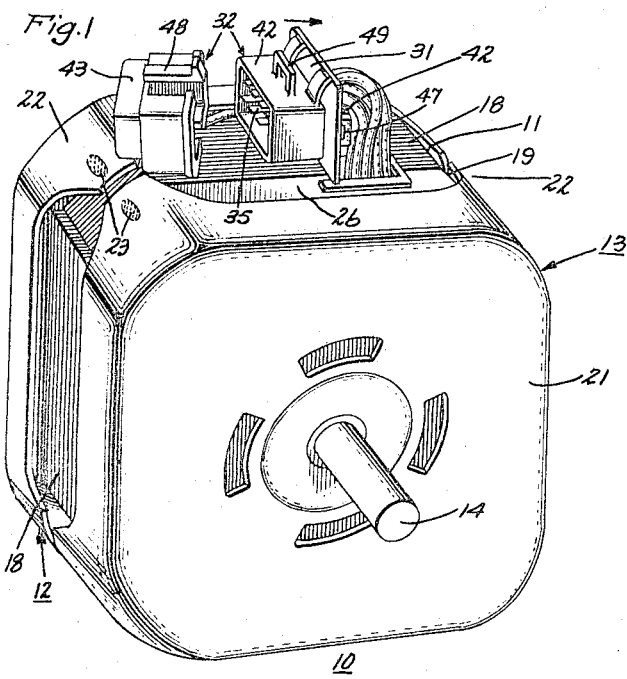
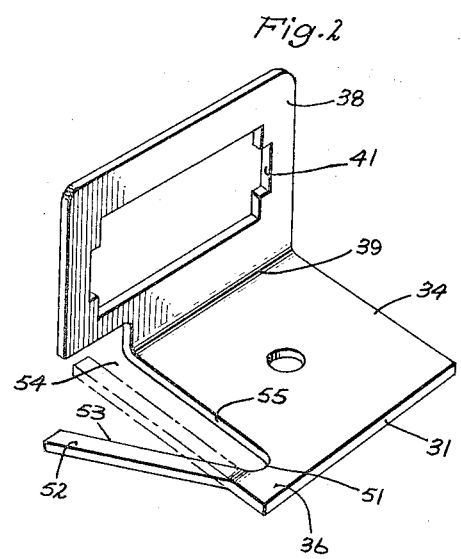
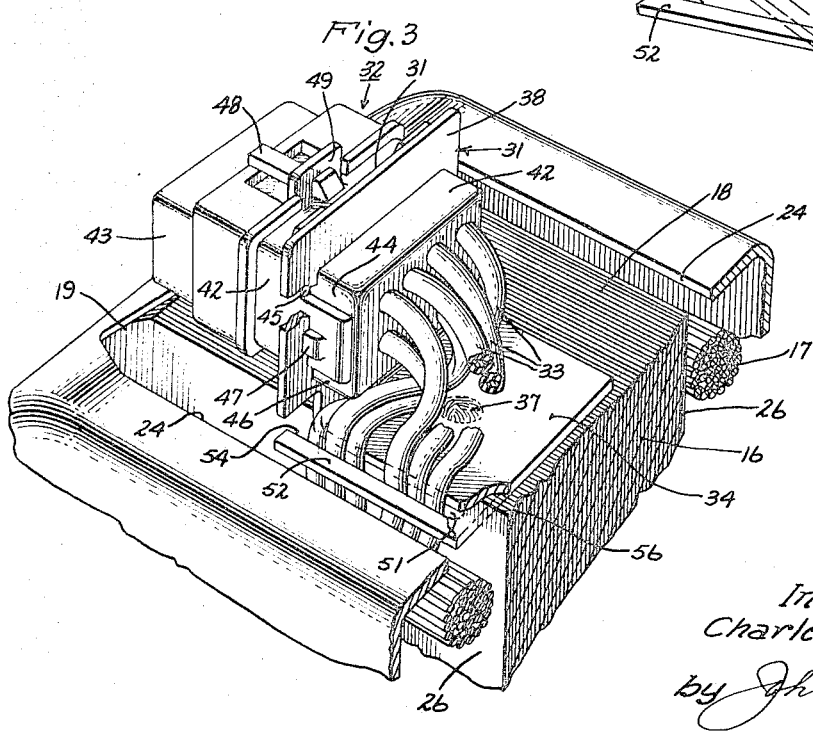

United States Patent Office 3,350,586
Patented Oct. 31, 1967

3,350,586
DYNAMOELECTRIC MACHINE ELECTRICAL COMPONENT MOUNTING AND LEAD SECURING ARRANGEMENT
Charles W. Otto, De Kalb, Ill., assignor to General Electric Company, a corporation of New York
Filed Feb. 19, 1965, Ser. No. 434,062
9 Claims. (Cl. 310—71)

ABSTRACT OF THE DISCLOSURE

A dynamoelectric machine stationary member having a core carrying excitation windings with a peripheral surface of the core being exposed to the ambient. A bracket is attached by a first section to the exposed surface and has a second section extending above the core to mount an electrical component, such as a terminal block, capacitor, or the like. A third section projects beyond one side face of the core and has an open-ended slot for accommodating electrical leads adjacent the core which electrically connect the electrical component in circuit with the excitation windings. One of the walls of the slot includes a deflectable portion movable between two positions to permit insertion of the leads into the slot in one position and to anchor the leads when the deflectable portion is in the second position.

---

This invention relates generally to improvements in dynamoelectric machines and more specifically, it relates to dynamoelectric machines, such as small and fractional horsepower motors, incorporating brackets and supports useful for mounting electrical components such as capacitors, terminal assemblies and for securing electrical leads in a fixed position relative to certain stationary parts of the dynamoelectric machine.

Dynamoelectric machines frequently necessitate the use of certain components therewith. For instance, many dynamoelectric machines are provided with a terminal block assembly for making a quick connection between the machine windings and a suitable source of power. Others, such as capacitor type split-phase motors employ a capacitor or other current phase-splitting device in circuit with the windings. It is therefore desirable to provide an improved yet inexpensive arrangement for mounting or securing the electrical components in a fixed position relative to stationary parts of the dynamoelectric machine, by way of illustration, the stator member. It is also desirable to secure the insulated electrical leads extending between the dynamoelectric machine windings and the electrical component so as to prevent displacement of the leads relative to the stationary machine parts like the stator or machine frame. For example contact of the leads with any portion of the rotating parts of the machine must be prevented. In addition, excessive movement of the leads with respect to one another or the stationary parts of the machine may cause the outer insulation covering the conductors to wear through and expose the bare conductor. Consequently, in the past it has been customary to secure the leads, either by fastening them directly to the winding end turns with string or with a clamping or clip assembly. Both of these approaches have been expensive from the standpoint of material cost and time needed to attach the leads in place. Due to the highly competitive conditions in the dynamoelectric machine manufacturing industry, and especially in the small motor manufacturing industry, it is of great advantage to reduce without obtaining a corresponding reduction in quality, the costs of manufacturing a dynamoelectric machine.

It would therefore be extremely advantageous in the highly competitive small motor manufacturing industry to provide an improved and low cost electrical component mounting and lead securing arrangement which is not only readily accessible from a location outside the confines of the machine frame but also is capable of inexpensive fabrication and installation. Moreover, the arrangement should facilitate the assembly of the associated electrical component and provide the desirable features mentioned above.

Accordingly, it is an object of this invention to provide an improved dynamoelectric machine construction having an arrangement for mounting an electrical component and for firmly securing electrical leads of the machine in fixed positions relative to the stationary assembly of the machine. It is a further object of this invention to provide an improved arrangement for use in a dynamoelectric machine having at least some of the desirable features mentioned above.

It is still another object of this invention to provide an improved yet inexpensive structure for mounting a dynamoelectric machine electrical component and for securing the component electrical leads, which is simple in construction, economical to manufacture, and easy to install.

Summary of the invention

In carrying out the objects in one form, I provide an improved dynamoelectric machine with a stator member having a core carrying excitation winding means. The stator is positioned within a frame such that a transverse peripheral surface of the stator core extends between the side faces of the core and is exposed to the ambient outside the machine. A bracket, attached by a first section to the exposed peripheral surface and has a second section formed with means raised above the core which mounts an electrical component of the machine. A third section of the bracket projects axially beyond one of the side faces of the core, radially outward of the winding means in spaced relation thereto, and includes an open-ended slot for accommodating electrical leads which connect the electrical component in circuit with the excitation winding means. One of the walls of the slot is formed by a deflectable portion located along one of the edges of the third section and is movable between first and second positions. In the first position, the deflectable portion permits insertion of the leads into the slots while in the second position, it provides tight frictional engagement of the leads with the slot walls.

In this manner, the leads are held firmly in place with respect to the stator member intermediate the electrical component and the winding means in order to anchor them. In addition, the slot and deflectable portion are located such that they are accessible externally of the motor, being unobstructed by other machine components for facilitating the insertion of the electrical leads into the slots.

By one aspect of the invention, the bracket is generally L-shaped, having the raised section formed in a single plane projecting in a direction generally away from the transverse surface of the core. The raised section incorporates an opening which accommodates an electrical component, such as a terminal block assembly, in spaced relation to the transverse surface to furnish an unobstructed terminal block assembly, readily accessible for making connections with both the winding means and an external power source.

By another aspect of the invention, for capacitor type split phase motors, the bracket is fabricated in one piece with a raised section having a pair of outstanding tongs in facing relation to mount a capacitor and a tab on either side of the raised section for interlocking with a capacitor cover to hold it in position over the capacitor.

In both aspects, the electrical component mounting arrangement is relatively low in cost and is readily accessible from a location outside the motor frame. In addition, the bracket itself is inexpensive to fabrication, being capable of easy installation in the desired position with respect to other parts of the machine.

*Brief description of the drawings*

The subject matter which I regard as my invention is particularly pointed out and distinctly claimed in the concluding portion of this specification. My invention, itself, however, both to its organization and method of operation, together with further objects and advantages thereof may best be understood by reference to the following description taken in connection with the accompanying drawings:

FIGURE 1 is a view in perspective of a fractional horsepower electric motor, constructed in accordance with one form of the present invention, having an electrical component mounting and lead securing bracket which supports a male member of a terminal block assembly, with the female terminal block member being illustrated preparatory to its installation onto the motor;

FIGURE 2 is an enlarged view in perspective of the electrical component mounting and lead securing bracket shown incorporated in the electric motor of FIGURE 1;

FIGURE 3 is an enlarged fragmentary view in perspective of a part of the electric motor shown in FIGURE 1, the view being partly broken away to reveal details of the terminal block assembly and the insulated leads which connect the motor winding to the terminal block assembly, with the terminal block assembly and leads supported in a fixed manner relative to the stationary assembly of the electric motor;

FIGURE 4 is a fragmentary view in perspective of an electric motor, having a capacitor for phase-splitting purposes, incorporating another form of the present invention in which the capacitor and its cover are shown ready for installation onto an electrical component mounting and lead securing bracket of the motor;

FIGURE 5 is a view in perspective of the bracket illustrated in FIGURE 4; and

FIGURE 6 is a fragmentary sectional view of part of the electric motor seen in FIGURE 4, illustrating the capacitor, its cover, and electrical leads supported in fixed positions on the stator of the electric motor.

*Description of the preferred embodiments*

Referring now to FIGURES 1-3 inclusive, one form of the present invention, for purposes of disclosure, is shown incorporated in a fractional horsepower electric motor generally indicated by numeral 10. In the illustrated form, motor 10 includes a stationary assembly comprised of the stator member 11 and a pair of end frames 12 and 13 which cooperate to support a rotor and shaft assembly 14 for relative rotation with respect to stator member 11 in the usual fashion. In the exemplification, stator member 11 has a laminated core 16 fabricated from a number of magnetic laminations punched out of relatively thin sheet material, such as steel stock, and attached together in stacked relation. The stator core accommodates the customary excitation windings indicated by numeral 17 in FIGURE 3. The core itself is of the so-called "square" type disclosed in the Smith Patent 2,812,-459, issued Nov. 5, 1957, having four generally planar, peripheral surfaces 18 of approximately equal lengths.

The peripheral corners 19 of the integrally joining adjacent sides have been rounded and each end frame, having an end shield 21 stamped from sheet material has a flanged portion 22 overlapping each peripheral corner of the core. Weld 23 rigidly fastens end shield flanged portion 22 to the associated peripheral corner 19. In the illustrated exemplification the end shield peripheral edge 24, located between each pair of flanged portions 22, curves away from welds 23 and axially beyond the associated side face 26 of the stator core to furnish a number of enlarged openings in the stationary assembly which are in direct communication with the interior of the motor and the motor windings. Thus, the end frames are constructed such that the four peripheral surfaces 18 of the core are unobstructed transversely across the core and are exposed and readily accessible from a location outside the motor frame.

In the first exemplification of the invention, a bracket 31 is fixedly attached on one of the four planar transverse surfaces of stator core 11 and mounts an electrical component in the form of a terminal assembly 32. The same bracket also serves to secure a number of insulated electrical leads 33 which electrically connect the windings in circuit with the male terminals 35 of the terminal assembly 32.

As most clearly shown in FIGURES 2 and 3, bracket 31 in its illustrated form for the first exemplification is a single piece member, generally L-shaped in cross section, which may be conventionally fabricated from suitable planar sheet material, such as rectangular steel or aluminum stock. Conventional and low cost stamping and bending operations may be employed to furnish the bracket with its initial configuration revealed in FIGURE 2 before it is installed onto surface 18 in the location seen in FIGURES 1 and 3. The bracket is formed with a generally planar base section 34 which is secured to one of exposed transverse core surfaces 18 such that an integral and co-planar section 36, having means for securing leads 33, projects axially beyond side face 26 of the core, radially above the end turns of excitation winding 17. This means will be discussed more fully below. Any suitable fastening arrangement may be employed to attach base section 34 onto surface, such as the provision of a small hole in the base section and welding the section at that location onto the core as indicated by numeral 37 in FIGURE 3.

The bracket also includes a raised or upright section 38, integrally joined to sections 34, 36 at 39, the raised section being bent along the integral joint, at right angles with respect to sections 34, 36, to extend outwardly away from core surface 18. An aperture or opening 41 is cut into bracket section 38 for accommodating or mounting terminal block assembly 32 in spaced relation to core 11. It will be recognized by those skilled in the art that the angle of bend for section 38 and its exact configuration are dependent upon the particular application, e.g., construction and type of electrical component being supported. In the exemplification, the terminal block assembly is of the commercially available kind, comprised of telescoping male and female blocks 42, 43 respectively formed of hard springy insulating dielectric material such as nylon. The male block 42 has a pair of grooves 44, 46 on opposed sides arranged to cooperate with a part of the walls defining opening 41 and a depressable lug 47 formed between the grooves.

To install male block 42 onto bracket 31, it is merely necessary to insert the block into opening 41 in the direction of the arrow shown in FIGURE 1. As lugs 47 pass through the opening they are temporarily depressed and thereafter return to their original extended positions to engage one surface of section 38 in the manner revealed in FIGURE 3. Walls 45 of grooves 44, 46 engage the opposite surface of bracket section 38, walls 45 and lugs 47 interacting with section 38 to prevent removal of the block from its assembled position on the bracket. The female block 43 is telescopically received over the terminal end of block 42 and is held in its finally assembled position depicted in FIGURE 3 by deflectable detent 48 formed on block 43 which interlocks with an upright cooperating inverted U-shaped piece 49 of male block 42. Leads 33 may be connected to the male terminals 35 of assembly 32 after installation of the assembly onto the bracket and, if desired, after the leads have been firmly anchored by means of bracket section 36 now to be described in detail.

Section 36 of bracket 31 is fabricated with an open-ended elongated slot 51 for receiving leads 33 and with a deflectable arm portion 52 at one edge of the section, the inner wall 53 of portion 52 being arranged to define a wall of the slot. The entrance 54 of the slot 51 is preferably enlarged by cutting out an adjacent portion of bracket section 38 to facilitate insertion of the leads into the slot. Initially, arm portion 52, with its inner edge 53, is bent away from the other wall 55 of the slot and is disposed in an open position, shown by the full lines in FIGURE 2, to permit ease in placement of the leads in a single row within slot 51. Thereafter, the arm portion is bent to the closed position indicated by the broken line in FIGURE 2 and shown in full in FIGURES 1 and 3, where the leads are firmly held in frictional engagement between slot walls 53, 55. To insure a tight clamping action preferably the distance between these opposed slot walls should be dimensionally less than the normal diameter of the leads.

It should be noted at this time from FIGURE 3 that it is also preferable for the slot 51 to be located slightly beyond the peripheral edge 56 of the core, extending parallel to that edge, so that the leads will be in spaced relation to side face 26 at that location, whether or not face 26 is covered with insulation, and edge 56 will not interfere with the clamping or locking action of slot walls 53, 55. In addition, with the illustrated construction, both the slot 51 and arm portion 52 are readily accessible from outside the confines of the machine and the other machine components will not interfere with the insertion of leads 33 into the slot nor with the movement of arm portion 52 between its open and closed positions. Further, terminals 35 are available for quick connection to a suitable external power source (not shown).

In the first embodiment of my invention, opening 41 in bracket section 38 may be so located that a portion of the terminal block assembly 32 is positioned to block slot entrance 54 (FIGURES 2 and 3) for retaining the leads within the confines of slot 51. Under these circumstances, the dimension between slot walls 53, 55 may conveniently be slightly greater than the diameter of the individual leads and there is no need to bend arm 52 initially to the position shown in solid in FIGURE 2. Thus, once bracket 31 has been attached to the stator core and the leads have been connected to terminals 35, the leads may be easily slid into slot 51 through entrance 54, and the terminal assembly 32 finally installed onto bracket 31 thereby trapping the leads in the slot 51 for retaining them at that location.

Turning now to the second embodiment of the present invention, the preferred form is illustrated in FIGURES 4, 5, and 6 in connection with a single phase capacitor split phase electric motor 60. Identical parts in these figures with those already described for the first embodiment of FIGURES 1-3 inclusive are identified by the same reference numerals. In the second embodiment, the electrical component is a standard capacitor 62 connected by insulated leads 63 and 65 in circuit with the excitation windings 70, main and auxiliary windings physically displaced on core 11 in the well known way. The winding circuit, including the phase splitting capacitor, connected in series with the auxiliary winding and in parallel with the main winding, is of standard design and will not be further described.

In the second embodiment, a single piece bracket 71 mounts or supports capacitor 62 as well as serving to anchor the capacitor lead 65 and leads 64, 66, 67 and 68 which place a winding control switch assembly 72, attached to end frame 22, in circuit with the windings for controlling their excitation. The base section of bracket 71 is comprised of two spaced apart, co-planar portions 73, 74, welded at 76 to transverse surface 18 of the core, which are integrally joined to a central raised section 77 having a pair of outstanding and slightly resilient tongs 78, 79 in facing relation, with the free ends of the tongs arranged to engage the periphery of the capacitor 62 as seen in FIGURE 6.

To complete the securement of the capacitor onto bracket 71, a cover 81 fits over the capacitor and is attached to the bracket. A T-shaped tab 82 extending outwardly from one edge of base portion 74 and a rectangular tab 83 projecting from the other base portion 73, cooperate with notches 84, 86 provided in suitable flanged projections 87, 88 respectively of the cover to effect the securement. The cover with the capacitor disposed inside and leads 63-68 inclusive in the positions shown in FIGURE 4, is attached to bracket 71 merely by inserting the neck of tab 82 into notch 84, swinging the other notch over tab 83, and bending tab 83 toward the cover as shown in FIGURE 6. Thus, tongs 78, 79 bias the capacitor 62 firmly against the inside surface of cover 81. For added stability, the width of the raised section 77 may be increased on the edge opposite section 91 and a second pair of tongs provided similar to tongs 78, 79.

As most clearly seen in FIGURE 5, the means for securing leads 64–68 in the second embodiment takes the form of a section 91, integrally joined to section 77, which extends axially beyond side face 26 of the core. An elongated slot 92 is provided adjacent the outer edge of section 91, with the major part of one side of the slot being defined by an inner wall 93 of a deflectable arm portion 94, bendable between open and closed positions respectively shown by the full and broken lines. Since the structural and functional details of slot 92 and arm portion 94 are similar to those for slot 51 and arm portion 52 already outlined for the first embodiment, no further description will be included herein. Preferably, of course, leads 64–68 should be anchored within slot 92, intermediate the capacitor and switch 72 on the one hand and the windings 70 on the other, before cover 81 is attached in place.

It will be readily manifest from the foregoing description that in both embodiments of the present invention, an improved dynamoelectric machine construction has been provided in which an electrical component may be inexpensively mounted by an arrangement which also furnishes a satisfactory securement or anchor for the leads which connect the winding of the machine to the electrical component. Additionally, the parts are inexpensive to fabricate and capable of easy installation in the desired position to make them readily accessible from a location outside the machine frame.

While I have shown and described what is considered to be the preferred two embodiments of my invention in accordance with the patent statutes, it will be obvious to those skilled in the art that changes and modifications may be made in the disclosed structure without departing from my invention, and it is, therefore, aimed in the appended claims to cover all such changes nad modifications as fall within the true spirit and scope of my invention.

What I claim as new and desire to secure by Letters Patent of the United States is:

1. A dynamoelectric machine comprising a stator member having a core carrying excitation windings, a frame mounting the stator member and formed with an opening exposing a peripheral surface of the stator core, an electrical component, at least one electrical lead connecting the electrical component in circuit with the excitation windings means for mounting the electrical component and for anchoring the at least one electrical lead relative to the stator member, said means having a first section attached to said exposed peripheral surface of the core, said means including a second section having a raised portion projecting in a direction generally away from said exposed peripheral surface mounting said electrical component and a third section extending adjacent a side face of said core, said third section firmly securing a portion of said lead adjacent said side face intermediate said electrical component and the excitation windings for anchoring the at least one electrical lead firmly in place with respect to said stator member.

2. A dynamoelectric machine comprising a stator member having a core carrying an excitation winding, a frame secured to the stator member and formed with an opening exposing a transverse peripheral surface of the stator core, electrical component, a number of electrical leads connecting the electrical component in circuit with the excitation winding, and a bracket attached to said exposed transverse peripheral surface, said bracket including a raised section having means in spaced relation to said exposed transverse peripheral surface for mounting said electrical component and another section formed with any open-ended elongated slot for receiving said leads, one of the walls of said slot being defined by a portion disposed in spaced relation to said core, said portion being deflectable between a first position to permit insertion of the leads into the slot and a second position to provide tight frictional engagement of the slot walls with the leads thereby securing a portion of said leads intermediate said electrical component and the excitation winding to anchor said leads firmly in place with respect to said stator member.

3. In a dynamoelectric machine having excitation windings and an electrical component, a stationary assembly including a stator member having a core for carrying the excitation windings, a plurality of electrical leads for connecting the electrical component in circuit with the excitation windings, and a bracket attached to said stationary assembly, said bracket including a raised section having means in spaced relation with said stationary assembly for mounting the electrical component, and another section having means including a portion in spaced relation to said stationary assembly retaining said leads intermediate the electrical component and the excitation windings for anchoring the leads in place with respect to said stationary assembly.

4. A dynamoelectric machine comprising a stationary assembly having a stator member including a core formed with a pair of side faces and a transverse peripheral surface extending between said faces, said core carrying excitation windings; at least one electrical lead connecting the excitation windings in circuit with an electrical component; and means for retaining the at least one electrical lead intermediate the electrical component and excitation windings attached to said transverse peripheral surface of said core, the at least one lead retaining means including a section having a part thereof disposed in spaced relation to said core and formed with an open-ended slot for accommodating said at least one electrical lead, a portion of said section part being positioned to retain the at least one electrical lead intermediate said electrical component and said excitation windings.

5. The dynamoelectric machine of claim 4 in which said section is generally planar and is attached to the transverse peripheral surface of the core such that the slot and retaining portion of the section are disposed axially beyond one of said core side faces, radially outwardly of said winding means in spaced relation thereto; said slot and its entrance being accessible and unobstructed for facilitating the insertion of the electrical lead into said slot.

6. A single piece, bracket formed of sheet material for mounting an electrical component onto a stationary member of a dynamoelectric machine, having excitation windings, and for securing electrical leads extending between the electrical component and the winding means; said bracket comprising at least two generally planar sections integrally joined together and extending away from one another at an angle; one of said sections having means formed therein for mounting the electrical component, the other of said sections being formed with a portion at an edge thereof and having an open-ended elongated slot partially defined by a wall of said portion for receiving and retaining the leads arranged to connect the electrical component and the excitation windings in circuit.

7. A single piece, generally L-shaped bracket formed of sheet material for mounting a terminal block assembly onto a stationary member of a dynamoelectric machine, having excitation windings, and for securing electrical leads extended between the terminal assembly and the excitation windings; said bracket comprising first and second generally planar sections integrally joined together at one edge thereof with the sections extending away from one another at an angle, one of said sections having an opening therein for accommodating a part of the terminal block assembly, the other of said sections including a deflectable portion at an edge thereof and having an open-ended slot formed with a wall of said deflectable portion for receiving the leads arranged to connect the terminal block assembly and excitation windings in circuit relation; said deflectable portion being movable between a first position permitting insertion of the leads into the slot and a second position providing a tight frictional engagement between the slot walls and the leads whereby the leads become firmly anchored in place relative to the bracket.

8. The dynamoelectric machine in claim 1 in which the electrical component is a terminal block assembly, said means includes a bracket being generally L-shaped and formed in a single piece from sheet material; said second section of said bracket being generally planar and having an opening in spaced relation to the other two sections for accommodating said terminal block assembly.

9. The dynamoelectric machine in claim 1 in which the electrical component is a capacitor; the said means includes a bracket formed in a single piece from sheet material; and the raised portion for mounting the electrical component includes a pair of outstanding tongs in facing relation engaging the periphery of the capacitor, a cover disposed over said capacitor, said bracket further including at least one tab extending outward from said first section and interlocking with said cover to secure the cover firmly onto the machine.

References Cited

UNITED STATES PATENTS

| | | | |
|---|---|---|---|
| 2,219,495 | 10/1940 | Sleeter | 310—72 |
| 2,683,824 | 7/1954 | Carville | 310—71 |
| 2,802,958 | 8/1957 | Curley | 310—71 |
| 3,012,159 | 12/1961 | Druesedow | 310—71 |
| 3,210,457 | 10/1965 | Hacock | 310—72 |

FOREIGN PATENTS

| | | |
|---|---|---|
| 222,580 | 4/1958 | Australia. |
| 951,673 | 3/1964 | Great Britain. |

MILTON O. HIRSHFIELD, *Primary Examiner.*

J. D. MILLER, *Examiner.*